March 6, 1951 O. J. HOLMES 2,544,554

MOUNTING FOR PHOTOELECTRIC CELLS

Filed March 26, 1948

INVENTOR.
Oscar J. Holmes
BY
Moore, Olson & Trexler
Attys.

Patented Mar. 6, 1951

2,544,554

UNITED STATES PATENT OFFICE 2,544,554

MOUNTING FOR PHOTOELECTRIC CELLS

Oscar J. Holmes, Chicago, Ill.

Application March 26, 1948, Serial No. 17,232

4 Claims. (Cl. 201—63)

This invention relates to a photo-sensitive cell and more particularly to the mounting structure for a photo-conductive, as distinguished from a photo-emissive, type of cell.

Photo-conductive cells using such materials as lead sulphide, thallous sulphide, galena, and the like are very sensitive and are manufactured by vaporizing the material within the envelope to form the photo-conductive layer upon the surface of the envelope. This manufacturing procedure requires the use of very special and expensive glass as the material of the envelope. Such photo-conductive cells are therefore made quite small as compared with photo-emissive cells and permit and require only a very small light transmitting aperture. It is impractical, if not impossible, to manufacture such cells by the procedures heretofore employed in the manufacture of photo-emissive cells and difficult, if not impossible, to manufacture such cells with glass envelopes of the size to be sealed or cemented to the usual or standard size pronged base with which such photo-emissive cells are provided.

In the production of such photo-conductive cells, it is extremely difficult to accurately position the coated or sensitized area of the envelope in proper relation to the base mounting terminals or prongs so that the coated or sensitized area will be properly positioned in alignment with the beam from the light source. Positioning of the electrical socket, while perhaps possible in the manufacture of apparatus initially employing that type of cell, does not solve this problem because the cells must be replaced from time to time in all such apparatus and it is desirable in many instances to replace the presently used photo-emissive cells with such a photo-conductive cell. It is accordingly an object of the present invention to overcome such difficulties in respect to the manufacture and mounting of photo-conductive cells and, more specifically, to provide a mounting structure for the glass envelope and external leads of a photo-conductive cell by means of which the envelope is, in the process of manufacture, automatically positioned with its sensitized or coated area in predetermined relation to the base terminals and mounting prongs.

Photo-conductive cells cannot be secured to or mounted in a terminal base or mounting plug by the cement process commonly employed in securing the glass envelope and lead terminals of a photo-emissive cell to its terminal base or plug. The cementing process has a very deleterious effect upon the sensitivity and accuracy of response of the photo-conductive cell. It is accordingly an object of this invention to provide a mounting structure and means securing the glass envelope and lead terminals of a photo-conductive cell to a terminal base or plug in such manner as to avoid the deleterious effects of such cementing process.

Photo-conductive cells are highly sensitive and are particularly affected by high frequency currents which, because of the inherent values of the capacities between the electrodes or terminals of the cell, tend to shunt the cell and thereby materially lower the sensitivity of the cell. It is therefore a further object of the invention to provide a photo-conductive cell or mounting for the glass envelope and electrodes or lead-in terminals of the cell which shall eliminate the deleterious effects of high frequency currents.

Other and further objects and advantages of the invention will be apparent from the following description when taken in connection with the accompanying drawings, wherein.

Figure 1:
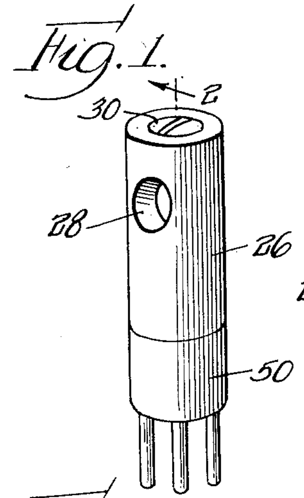
Figure 1 is a view in perspective of a photo-sensitive cell embodying the present invention.
Figure 2:
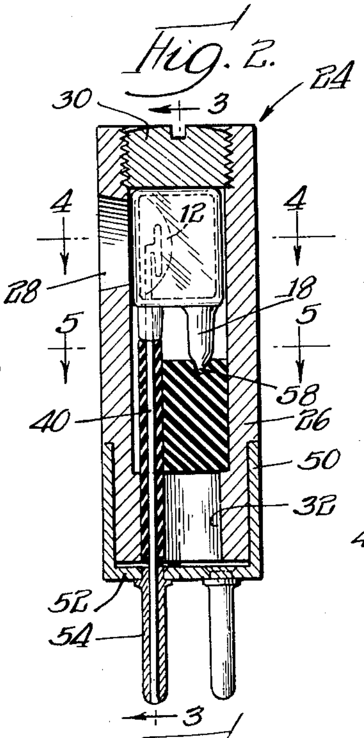
Figure 2 is an enlarged view in vertical section taken substantially along the line 2—2 of Figure 1.
Figure 3:
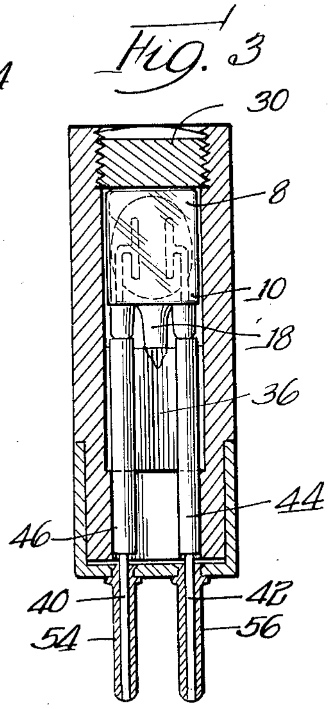
Figure 3 is an enlarged view in vertical section taken substantially along the line 3—3 of Figure 2.
Figure 7:
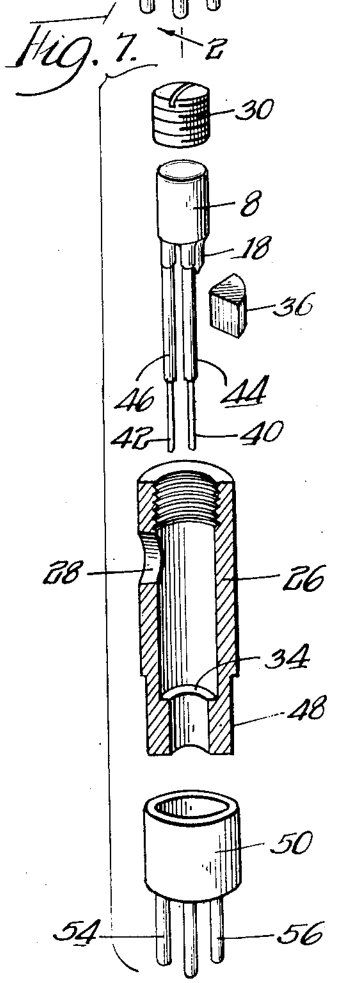
Figure 7 is an exploded view in perspective, and partly in section, of the several parts of the cell and mounting structure shown in Figures 1–6.

A preferred embodiment of a photo-sensitive cell constructed in accordance with the present invention comprises a photo-conductive unit 8 consisting of a small glass envelope 10 generally cylindrical in form and provided with a sensitized area 12 formed by vaporization within the envelope of material such as lead sulphide, thallous sulphide, galena and the like. The unit is also provided within the envelope 10 with electrically conductive terminals 14 and 16 in electrically conducting relation to the photo-conductive coating upon the sensitized area 12. The glass envelope 10 is also formed with the depending tubular portion 18 by means of which the envelope is evacuated in the process of manufacture and which, when the desired vacuum has been achieved, is sealed off in the usual manner. The glass envelope is also formed with dependent tubular portions 20 and 22 through which the terminal wires or electrodes 14 and 16 extend and from which they project and to which they are sealed in the usual manner. A housing 24, preferably in the form of a cylinder 26 of suitable material, or coated with a suitable material, so that it may act as a radio frequency shield, receives the photo-conductive unit 8 and is provided with aperture 28 which must, in the manufacture of the device, be precisely aligned with respect to the sensitized area 12 of the glass envelope 10. This cylinder 26 is open at its opposite ends, the upper end being internally threaded to receive an externally threaded cap or closure member 30. The cylinder is also provided internally with a reduced portion 32 extending inwardly from its lower end so as to form an annular shoulder 34 forming a seat for a resilient mounting block 36 of rubber or like material. The block 36 is preferably in the form of a segment having concave recesses or grooves 38 in the generally radial surfaces of the segmental block. The external ends or portions 40 and 42 of the terminals or electrodes 14 and 16 are provided with non-conductive enclosing sleeves 44 and 46 preferably of rubber but they may be of any other suitable non-conductive material.

The cylinder 26 is externally reduced inwardly from its lower end as at 48 for interfitting with a cylinder 50 of non-conductive material, the cylinder 50 having the integral end closure or bottom portion 52 to which is riveted the usual hollow terminal or plug prongs 54 and 56 into which the terminal leads 40 and 42 extend. The terminals 40 and 42 are electrically connected to the terminal prongs 54 and 56 in the usual manner, i. e., by crimping of the prongs or by soldering of the leads to the prongs. The cylinder 50 has a wall thickness substantially the same as the recessed portion 48 of the housing tube 26 so that its outer wall or surface is substantially flush with the outer wall or surface of the tube 26.

Figure 6:
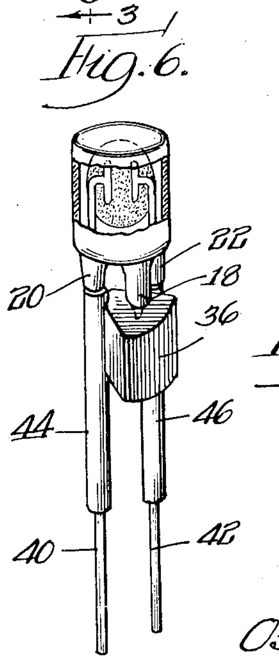
Figure 6 is a view in perspective of a portion of the structure shown in Figures 1–5.
Figure 4:
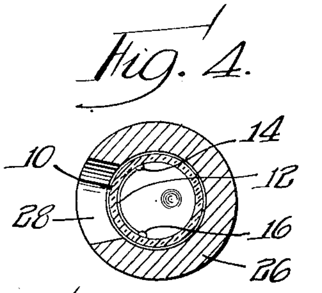
Figure 4 is a view in horizontal section taken substantially along the line 4—4 of Figure 2.
Figure 5:
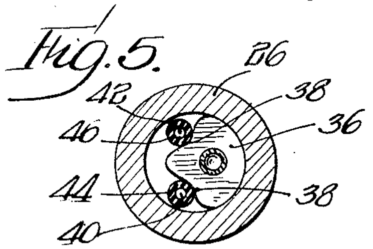
Figure 5 is a view in horizontal section taken substantially along the line 5—5 of Figure 2.

The resilient rubber mounting block 36 may, if desired, be provided with a locating aperture 58 for the seal-off tubulation 18, although this is not essential for the photo-conductive unit 8 will be properly oriented or located with respect to the rubber block by the interfitting engagement of the rubber sleeves 44 and 46 with the concave notches 38 in the radial faces of the rubber block 36. In the assembly of the cell, the photo-conductive unit is first provided with the rubber sleeves 44 and 46 and then assembled with the rubber block 36 in the position as shown in Figures 5 and 6 before or after the insertion of the rubber block in the housing tube 26. The vertical positioning of the rubber block is precisely determined by the annular shoulder 34 and this position determination of the block serves roughly to locate the photo-conductive unit in the housing tube 26. The closure member 30 is then threaded into the upper end of the housing tube. Considerable manufacturing tolerance is required in respect to the length of the seal-off tubulation 18. The position of elevation therefore of the photo-conductive unit within the housing tube must therefore be variously adjusted so as to horizontally align the sensitized or coated area 12 with the light transmitting window or opening 28 in the housing tube. The closure member 30 serves, by engagement with the envelope 10 of the photo-conductive unit, to depress the unit into the rubber block 36 to secure such alignment, the rubber block being of sufficient height to position the unit with the smallest seal-off tubulation in such alignment.

It will thus be evident that the annular shoulder 34 in the housing tube 26, the height of the rubber block 36, and the concave notches 38 in the radial face of the block, cooperating with the lead-in wires of the photo-conductive unit, serve accurately to orient the sensitized area of the photo-conductive unit with the light transmitting window or opening and the rubber block, in cooperating with the closure member 30, serves to secure proper horizontal alignment of the sensitized coated area of the unit with respect to that window or opening.

It should be noted that the rubber block 36, while somewhat resilient, is nevertheless sufficiently firm to positively counteract any tendency for the photo-conductive unit to move or vibrate within the tubular housing 26 and the block is yet sufficiently gentle or yieldable positively to prevent any breakage of the very fragile glass envelope 10 of the photo-conductive unit or its seal-off tubulation 18.

Changes may be made in the form, construction, and arrangement of the parts without departing from the spirit of the invention or sacrificing any of its attendant advantages, and the right is hereby reserved to make all such changes as fairly fall within the scope of the following claims.

I claim:

1. A photo-conductive cell comprising an evacuated envelope having a light transparent portion provided with a photo-conductive coating and lead-ins extending from said coating outside said envelope, a housing for said member, said housing having a light transmitting window, a resilient support in said housing for said envelope, said support having locating surfaces engaging said lead-ins to orient the photo-conductive coating of the envelope, said support and said housing being constructed and arranged automatically to align the coated portion of the envelope with respect to said window upon insertion of the envelope and support in said housing, and means adjustably carried by said housing and engageable with said envelope to adjust the envelope axially of the housing against the resilient action of the support to align the coated area with respect to the axis of the light transmitting window of the housing.

2. A photo-conductive cell comprising a multiprong base of standard size, a tubular housing secured to said base, a light transmitting window in the wall of said housing, an internal arcuate shoulder in said housing spaced below said window, a rubber block seated on said shoulder, an evacuated envelope having a seal-off tubulation bearing on said block and having terminals interfitting with and engaging said block to orient the envelope with respect to the block, said envelope having a light transmitting portion coated with a photo-conductive substance, said terminals extending into said envelope into electrical contact with said coating, an adjustable closure member for the upper end of said housing and adapted to bear against said envelope to adjust the envelope with respect to said window to align the coated portion of the envelope with said window.

3. A photo-sensitive cell comprising an evacuated envelope enclosing a photo-sensitive element and having terminals extending therefrom, a hollow housing receiving and completely enclosing said envelope and having a transverse light-transmitting window, a resilient mounting support underlying said envelope in said housing and having surfaces complementary to said terminals and engaging the same, and a connector base secured to said housing and having terminals connected to the terminals extending from said envelope.

4. A mounting structure for a photo-conductive cell having lead-in terminals, said mounting structure comprising a housing open at one end to receive the photo-conductive cell, a resilient support in said housing engaging said terminals and forming a mounting base for said cell, said support and said housing substantially defining the locus of said cell, said housing having a transverse light transmitting window in alignment with the sensitized areas of the photo-sensitive cell and a closure member for the open end of said housing.

OSCAR J. HOLMES.

REFERENCES CITED

The following references are of record in the file of this patent:

UNITED STATES PATENTS

| Number | Name | Date |
|---|---|---|
| 1,764,368 | Thomas | June 17, 1930 |
| 1,946,681 | Frappier et al. | Feb. 13, 1934 |
| 1,948,766 | Lyon | Feb. 27, 1934 |
| 1,963,692 | Clark | June 19, 1934 |
| 2,031,646 | Haas | Feb. 25, 1936 |
| 2,041,816 | Carpenter et al. | May 26, 1936 |
| 2,055,017 | Praetorious et al. | Sept. 22, 1936 |
| 2,148,023 | Karolus | Feb. 21, 1939 |
| 2,448,516 | Cashman | Sept. 7, 1948 |
| 2,493,919 | Holmes | Jan. 10, 1950 |

FOREIGN PATENTS

| Number | Country | Date |
|---|---|---|
| 353,172 | Great Britain | July 23, 1931 |
| 367,036 | Great Britain | Feb. 15, 1932 |